July 12, 1966  R. C. ROBINSON  3,260,874
ROTOR FOR A DYNAMOELECTRIC MACHINE
Filed Aug. 30, 1963

WITNESSES:
John L. Chopp
Edward F. Possessky

INVENTOR
Robert C. Robinson
BY
ATTORNEY

United States Patent Office 3,260,874
Patented July 12, 1966

3,260,874
ROTOR FOR A DYNAMOELECTRIC MACHINE
Robert C. Robinson, Wilkinsburg, Pa., assignor to Westinghouse Electric Corporation, Pittsburgh, Pa., a corporation of Pennsylvania
Filed Aug. 30, 1963, Ser. No. 305,796
5 Claims. (Cl. 310—64)

The present invention relates to dynamoelectric machines and more particularly to rotors for such machines.

The operating efficiency of a dynamoelectric machine is adversely affected by a number of energy loss factors such as hysteresis losses, eddy current losses, friction losses and windage losses. It is the latter factor toward which the present invention is primarily directed to achieve improvement in dynamoelectric machine operating efficiency.

Windage losses are due substantially to the mechanical energy consumed in effecting rotor rotation against the impedance of environmental fluid or air. However, in many instances, a rotor is structurally arranged to make beneficial use of surrounding air by directing such air across the machine stator for cooling purposes, and the energy consumed in this process might better be characterized as an energy expenditure rather than an energy loss because of the benefit obtained. On the other hand, within this definitional framework, windage losses are realized in the machine cooling rotor action to the extent that such action is obtained through inefficient use of fluid flow principles in the rotor structure. Improvement in machine operating efficiency can therefore be achieved through rotor structure which makes comparatively improved or optimum use of such principles.

In accordance with the principles of the present invention, a rotor for a dynamoelectric machine comprises a rotatable core member divided into a plurality of axial segments by means of a plurality of elongated vent duct fingers or blades disposed between each adjacent pair of core segments. The vent duct blades are spaced from each other in the circumferential direction, and each blade extends outwardly at an angle to a reference diametrical line through its inner end. The particular angle at which each blade is disposed is preferably optimized to achieve minimum dynamic air resistance and it depends upon the overall structural and rating design of the machine since the dynamic characteristics of the air flow pattern depend on such design factors as rotor size, rotor speed range, air intake volume, etc. If the motor conductors have a suitable geometry, as do the rotor bars in an induction motor, for example, the rotor conductors can be similarly angularly disposed for the same reason.

It is therefore an object of the present invention to provide a novel rotor for a dynamoelectric machine which operates with improved efficiency.

Another object of the invention is to provide a novel rotor for a dynamoelectric machine which operates with comparatively reduced windage losses.

A further object of the invention is to provide a novel rotor for a dynamoelectric machine which is provided with vent cooling and comparatively reduced windage losses associated with such cooling function.

These and other objects of the invention will become more apparent upon consideration of the following detailed description along with the attached drawing, in which.

Figure 1:
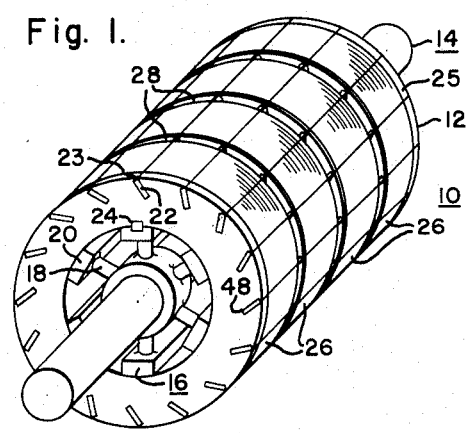
FIGURE 1 is a perspective view, with portions omitted for simplicity, of a dynamoelectric machine rotor constructed in accordance with the principles of the invention.

More specifically, there is shown in FIG. 1 a rotor 10 for use in a dynamoelectric machine (not shown). The rotor 10 comprises a core 12 supported on a shaft 14 by a spider member 16 having spider arms 18 adjacent each end of the core 12 with support bars 20 extending axially between the spider arms 18. Substantial space is thus provided for axial intake of air into the rotor 10 for discharge across the rotor-stator air gap. If the core is supported directly on the rotor shaft 14 rather than by a spider member, a plurality of axial vent holes are preferably provided through the core member 12 for the purpose of obtaining axial air intake.

In this instance, the rotor 10 is arranged structurally for use in an induction motor and the core 12, which is preferably formed from a plurality of laminae or punchings suitably secured together by bolts (not shown) or other means, is thus provided with a plurality of axially extending bar conductors 22 distributed about the circular periphery of the rotor 10 and suitably secured to respective end rings 23 and 25. Further, the core 12 is supportingly keyed to the spider 16, as indicated by the reference character 24, and it is divided into a plurality of axial core segments 26 by respective vent ducts 28 extending generally in the radial dimension from the inner diameter to the outer diameter of the core 12 and bridged by the bar conductors 22. Air drawn axially through the spider 16 can be discharged generally in the radial direction through the vent ducts 28 for the purpose of stator cooling.

A plurality of elongated vent duct fingers or blades 30 (formed from electrical steel, for example) operate as spacers between adjacent core segments 26 and thus provide the space for the vent ducts 28 and the directivity needed for efficiently discharging coolant air taken axially into the rotor 10. Preferably, a blade 30 is provided between each adjacent pair of rotor bar conductors 22 so that side support is provided for teeth 32 on each vent plate 34 and each punching (not shown) positioned oppositely of each vent plate 34. Each vent plate 34 is a special punching which is positioned adjacent a vent duct 28 so as to serve as a base member to which the blades 30 are secured in the machine assembly.

Figure 5:
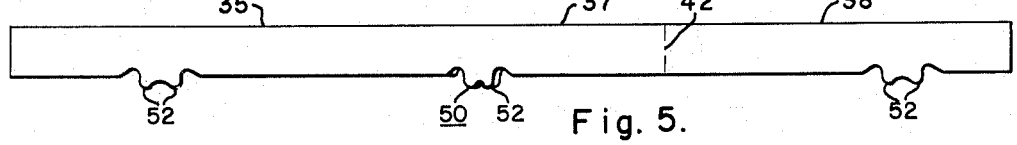
FIG. 5 is a top plan view of the blade shown in FIG. 4.

Reversely positioned elbows 36 can be incorporated in each blade 30 so as to provide offset longitudinal blade portions 35 and 37. This offset arrangement is effective to prevent the blade from tipping over during assembly with the vent plates 34. Further, only blades 38 extend substantially from the inner diameter to the outer diameter of each vent plate 34 and blades 40 are less extensive and for this purpose can be formed from the longer blades 38 by cutting or the like as indicated by the reference character 42 in FIG. 5.

In order to provide adequate or desired air flow cross section adjacent the inner diameter of each vent duct 28, the blades 38 can be disposed in every fourth or fifth position while the shortened blades 40 are arranged in groups of three or four with the blades 38 between such groups. The particular blade distribution pattern employed will vary with machine design according to machine size, number of rotor conductors and other factors.

Figure 2:
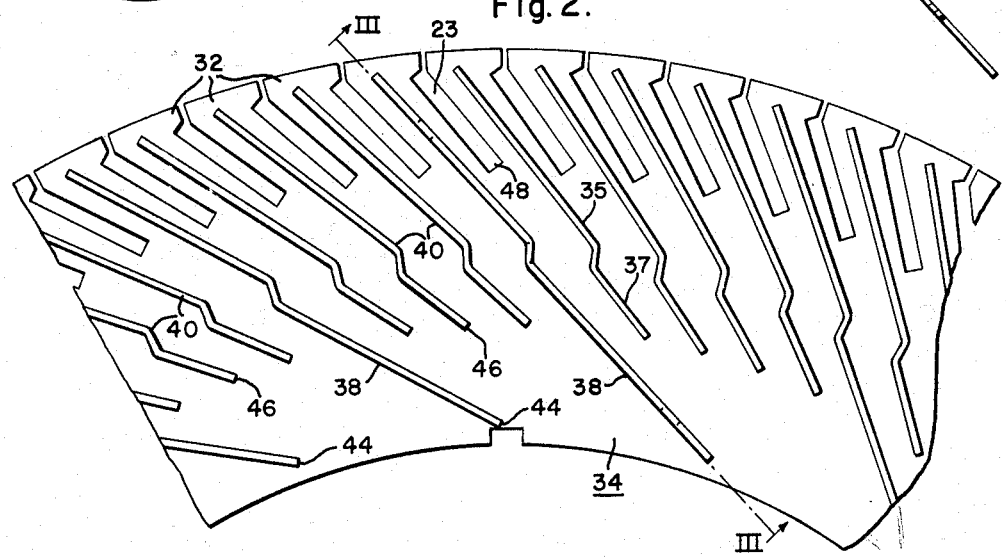
FIG. 2 shows a portion of an enlarged partial cross section of the rotor of FIG. 1 with portions thereof removed for clarity.
Figure 4:
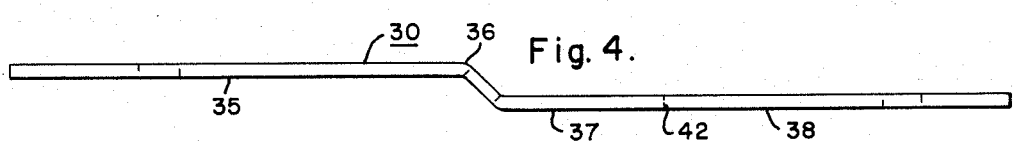
FIG. 4 is an enlarged side view of an elongated vent duct blade employed in the rotor of FIG. 1.

Each blade 30 is disposed at an angle with a reference diametrical line through an inner end 44 or 46 thereof. As noted previously, this angle is optimized to achieve minimum dynamic air flow resistance and as such will vary with machine design. Thus, when the rotor 10 is rotated in the clockwise direction (with reference to FIG. 2) the air flow direction tends to be along the outward extending direction of the blades 30 and minimum machine windage loss can be achieved by optimizing the angular disposition of the blades 30 for minimum dynamic air flow resistance.

Since the rotor 10 is provided with induction motor rotor conductors or bars 22, such bars and slots 23 in which they are disposed are also preferably inclined at an angle to a reference diametrical line through an inner end 48 thereof again to minimize windage loss. In the case of a wound rotor, it can also be profitable to incline the windings similarly to the manner just described, particularly if such windings have a rectangular cross section or if such windings are two or more deep or abreast in the associated winding slots.

Figure 3:
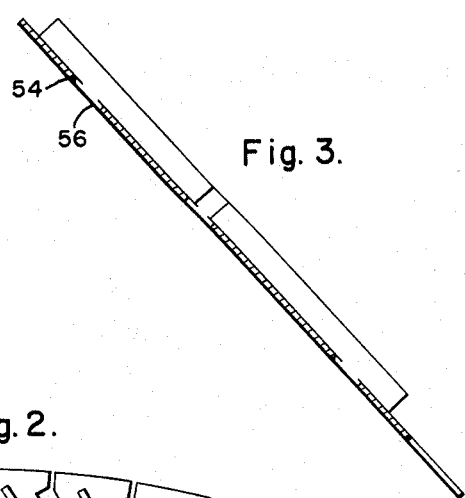
FIG. 3 shows a chord section taken along the reference line III—III of FIG. 2.

Securing means 50, including tabs 52 (FIG. 5), are provided for attaching each blade 30 to the associated vent plate 34. Each pair of tabs 52, when inserted into a mating vent plate slot 54 (FIG. 3), are turned over as indicated by the reference character 56 (FIG. 3) so as to provide a tight fit between the blade 30 and the vent plate 34. The projecting extent of the tabs 52 when turned over is less than the thickness of the vent plate 34 so that the vent plate 34 can fit flush against the adjacent core laminae. A pair of securing tabs 52 is preferably disposed adjacent the elbows 36 so as to increase the structural stability of the blades 30 in this vicinity.

In summary, stator cooling is efficiently achieved through air discharge from vent ducts in a rotor since the venting action is achieved with comparatively reduced windage losses. The operating efficiency thus achieved can be realized generally in dynamoelectric machines and has particular utility where premium efficiency machines are required. The improvement in operating efficiency is achieved with little or no additional manufacturing cost. Such efficiency improvement has been experimentally verified in an induction motor, for example in one test an induction motor employing the structure disclosed herein demonstrated approximately a 30% reduction of total windage loss as compared to a conventional radial vent duct finger design.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A rotor for a dynamoelectric machine comprising core and shaft members through which an axial coolant air intake is provided, said core having a plurality of conductors disposed in slots extending in the axial direction about the outer periphery thereof and further having at least one vent duct extending generally in the radial direction and dividing said core into axial core segments, a plurality of elongated blades disposed in said vent duct to space said core segments from each other, said blades spaced from each other in the circumferential direction, each of said blades extending generally outwardly through said vent duct and disposed at an angle to a diametrical reference line through the inner end thereof so as to produce efficient air flow through said vent duct, means for securing said blades to at least one of said core segments and said conductor slots being disposed at an angle with a diametrical reference line through the inner end thereof so that said conductors can also be angularly inclined to produce efficient air flow through said vent duct.

2. A rotor for a dynamoelectric machine comprising core and shaft members through which an axial coolant air intake is provided, said core having a plurality of conductors disposed in slots extending in the axial direction about the outer periphery thereof and further having at least one vent duct extending generally in the radial direction and dividing said core into axial core segments, a plurality of elongated blades disposed in said vent duct to space said core segments from each other, said blades spaced from each other in the circumferential direction, each of said blades extending generally outwardly through said vent duct and disposed at an angle to a diametrical reference line through the inner end thereof so as to produce efficient air flow through said vent duct, means for securing said blades to at least one of said core segments, said means comprising a vent duct plate on one of said core segments adjacent said vent duct, and a plurality of securing tabs on each of said blades disposed in corresponding slots in said vent plate and turned over to secure said blades to said vent plate.

3. A rotor for an induction motor comprising core and shaft members through which an axial coolant air intake is provided, said core having a plurality of bar conductors disposed in slots extending in the axial direction about the outer periphery thereof and further having at least one vent duct extending generally in the radial direction and dividing said core into axial core segments, a plurality of elongated blades disposed in said vent duct to space said core segments from each other, each of said blades extending generally outwardly through said vent duct and disposed at an angle to a diametrical reference line through the inner end thereof so as to produce efficient air flow through said vent duct, means for securing said blades to at least one of said core segments, each of said bar conductor slots also disposed at an angle with a diametrical reference line through the inner end thereof so that said bar conductors can also be angularly inclined to produce efficient air flow through said vent duct.

4. A rotor for an induction motor as set forth in claim 3 wherein a blade is provided between each adjacent pair of bar conductor slots and wherein some of said blades extend substantially from the inner diameter to the outer diameter of said core member and the remaining blades extend from an intermediate core radial point substantially to the outer core diameter so as to provide adequate air flow cross section adjacent the inner diameter of said core member.

5. A rotor for an induction motor as set forth in claim 3, wherein a blade is provied and extended between each adjacent pair of said bar conductor slots, wherein some of said blades extend substantially from the inner diameter to the outer diameter of said core member and the remaining blades extend from an intermediate core radial point substantially to the outer core diameter so as to provide adequate air flow cross section adjacent the inner diameter of said core member, and wherein each of said blades is provided with offset longitudinal portions connected by reversed elbow bends.

References Cited by the Examiner

UNITED STATES PATENTS

| | | | |
|---|---|---|---|
| 635,739 | 10/1899 | Bergmann | 310—64 |
| 752,168 | 2/1904 | Holsworth | 310—61 |
| 2,047,487 | 7/1936 | O'Leary | 310—211 |
| 2,176,871 | 10/1939 | Harrell et al. | 310—64 |
| 3,133,215 | 5/1964 | Porter et al. | 310—61 |

MILTON O. HIRSHFIELD, *Primary Examiner.*

ORIS L. RADER, *Examiner.*

L. L. SMITH, *Assistant Examiner.*